F. H. YOUNG.
MECHANICAL MOVEMENT.

No. 185,381. Patented Dec. 12, 1876.

Witnesses.
Fred. C. Mills
W. J. Pratt

Inventor.
Frederic H. Young
per Crosby & Gregory
Attys.

UNITED STATES PATENT OFFICE.

FREDERIC H. YOUNG, OF KINGSTON, MASSACHUSETTS, ASSIGNOR TO
JAMES L. HALL, OF SAME PLACE.

IMPROVEMENT IN MECHANICAL MOVEMENTS.

Specification forming part of Letters Patent No. 185,381, dated December 12, 1876; application filed September 2, 1876.

*To all whom it may concern:*

Be it known that I, FREDERIC H. YOUNG, of Kingston, in the county of Plymouth and State of Massachusetts, have invented Improved Mechanical Movements, of which the following is a specification:

This invention relates to mechanical movements wherein one lever acting upon a roller imparts motion to a second lever.

My invention is shown as applied to a bolt, or iron cutter, or shear, but is equally applicable to various other classes of machines, as saw gummers and sets, presses, punches, &c.

The invention is an improvement on United States Patent No. 166,844. That patent shows two levers with an intermediate roller or toothed wedge, and the shortest lever is acted upon by a strong spring that lifts it when released from the pressure of the upper lever, thereby keeping the toothed surface of the shortest lever in engagement with the roller, and the latter with the toothed surface of the longer or cam lever. In that patent, if, for any reason, the shortest or actuated lever, carrying the cutter or other tool, is caught, bound, or held down, and does not rise promptly as the cam-lever rises, then the teeth of the roller slip out of engagement with the teeth of the actuated or cam lever, or both, and the parts thereafter fail to work together with proper relation to each other, and it is necessary to reset the roller by hand.

The object of my invention is to overcome the possibility of this roller or wedge becoming disengaged from the proper teeth of the levers. I connect the cam-lever with the actuated lever by a link, the roller engaging teeth of both levers, and moving between them, and the link serving to lift the lower or actuated lever through its connection with the upper or cam lever, when the latter is lifted. Instead of making the teeth as part of the actuated lever, I form them on a bar connected with it, and acted upon by a spiral or other equivalent spring, this spring keeping the bar of teeth in engagement with the teeth of the roller under all circumstances.

Figure 1:
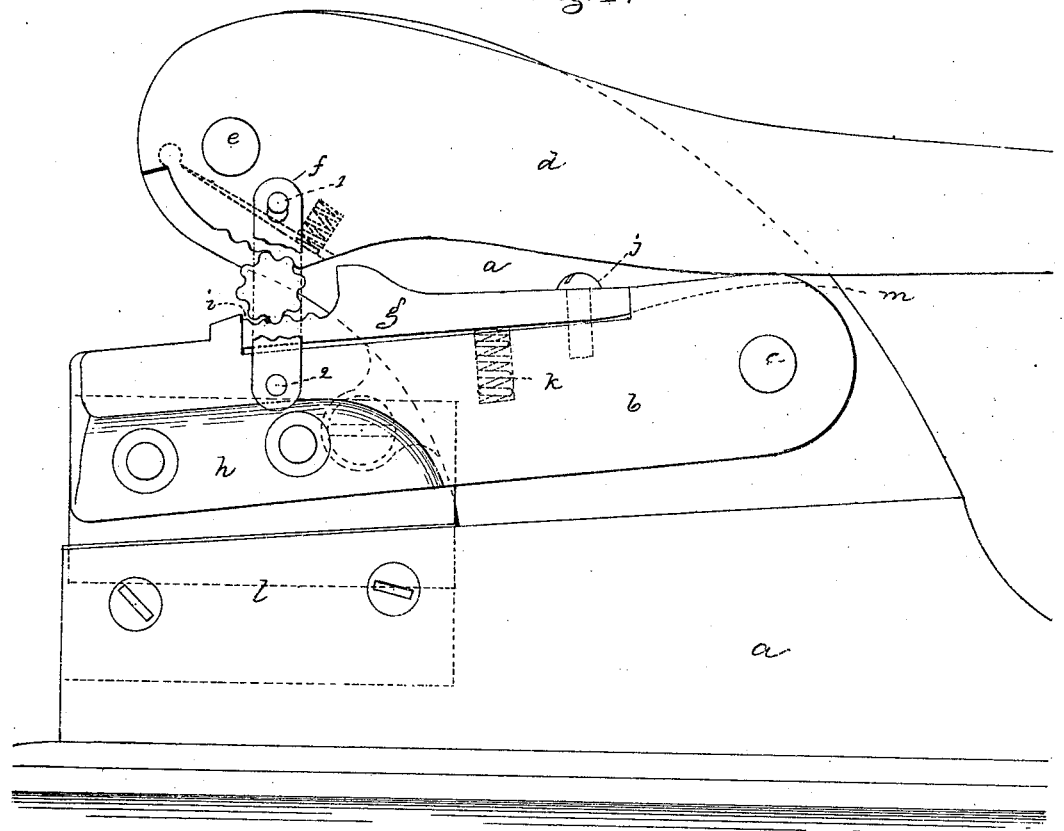
Figure 2:
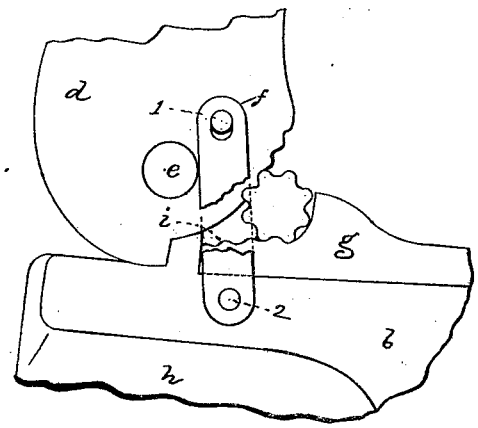

Figure 1 represents a bolt-cutter or iron-shears provided with my invention, the blades being closed, and the connecting-link being partially broken out; and Fig. 2 shows a detail of the roller and toothed surfaces, with the blades open.

The frame $a$ of the machine of proper strength and shape supports the actuated lever $b$ on a fulcrum, $c$, and the cam-lever $d$ on a fulcrum, $e$. A link, $f$, connects the two levers, engaging, in this instance, pins or studs 1 2 thereon. The hole in the link, at that end where it engages or passes over pin 1, is elongated, so that the pin 1 will not press the link down when the cam-lever is depressed, but will leave the link passive, permitting the cam-lever and rolling wedge to alone depress the actuated lever. The teeth $i$ for the actuated lever, instead of being formed as an integral or fixed part of such lever, are formed in a separate toothed bar, $g$, (preferably of steel,) and in this instance attached to lever $b$ by a screw, $j$, a spiral or other suitable spring, $k$, (shown in dotted lines,) operating upon such toothed bar, keeping it always up into engagement with the teeth of the roller as the cam-lever is lifted, so that the roller and teeth are always in proper engagement. The lever $b$ is shown as provided with a cutting or shear blade, $h$, that operates in connection with a second blade, $l$, both suitably attached by means of screws.

By controlling the position of the rack $g$ by means of a spring the efficiency and value of the machine are materially enhanced, for the roller always remains pressed by the toothed bar $g$ against the teeth of the cam-lever, and the roller is always retained in proper working engagement with both sets of teeth on the levers.

Instead of a spiral spring, $k$, I may use any ordinary flat spring, or I may attach a spring directly to the bar $g$ and extend it backward, as shown in dotted lines $m$, and secure it to the lever $b$ by a suitable screw or bolt. Instead of making the teeth of the lever $b$ to yield, as shown, I may arrange the teeth of the cam-lever to yield and hold the roller always in proper position.

To apply this invention of the yielding teeth to the cam-lever a portion of the cam-lever, as represented in dotted lines, might be made as a separate piece, forming a toothed sector pivoted on the cam-lever, a spring being interposed between the toothed sector and the lever to move it toward and retain it in contact with the roller, preventing it from slipping.

In the movement of the cam-lever from its uppermost to its lowermost position, at which time the greatest power is applied to the actuated lever, the roller or rolling wedge gradually approaches the pivotal center of the cam-lever and the outer end of the actuated lever. (See Fig. 1.)

I claim—

1. A toothed cam-lever and toothed actuated lever and link to connect the two levers, in combination with a rolling wedge interposed between the toothed surfaces, and with a spring to press one of the toothed surfaces against the roller to retain the toothed surfaces and roller in proper engagement, all substantially as set forth.

2. The toothed cam-lever and actuated lever provided with teeth, in combination with a link directly connecting the two levers, and slotted at one end to operate substantially as described.

In testimony whereof I have signed my name to this specification in the presence of two subscribing witnesses.

FREDERIC H. YOUNG.

Witnesses:
  THOMAS PRINCE,
  FRED C. BAILEY.